3,324,630
CROSSFLOW SCRUBBING PROCESS
Aaron J. Teller, 8 Brook Lane, Manhasset, N.Y. 11030, and Srini Vasan, 852 Glencoe Drive, Glencoe, Ill. 60022
Filed June 7, 1965, Ser. No. 461,966
3 Claims. (Cl. 55—90)

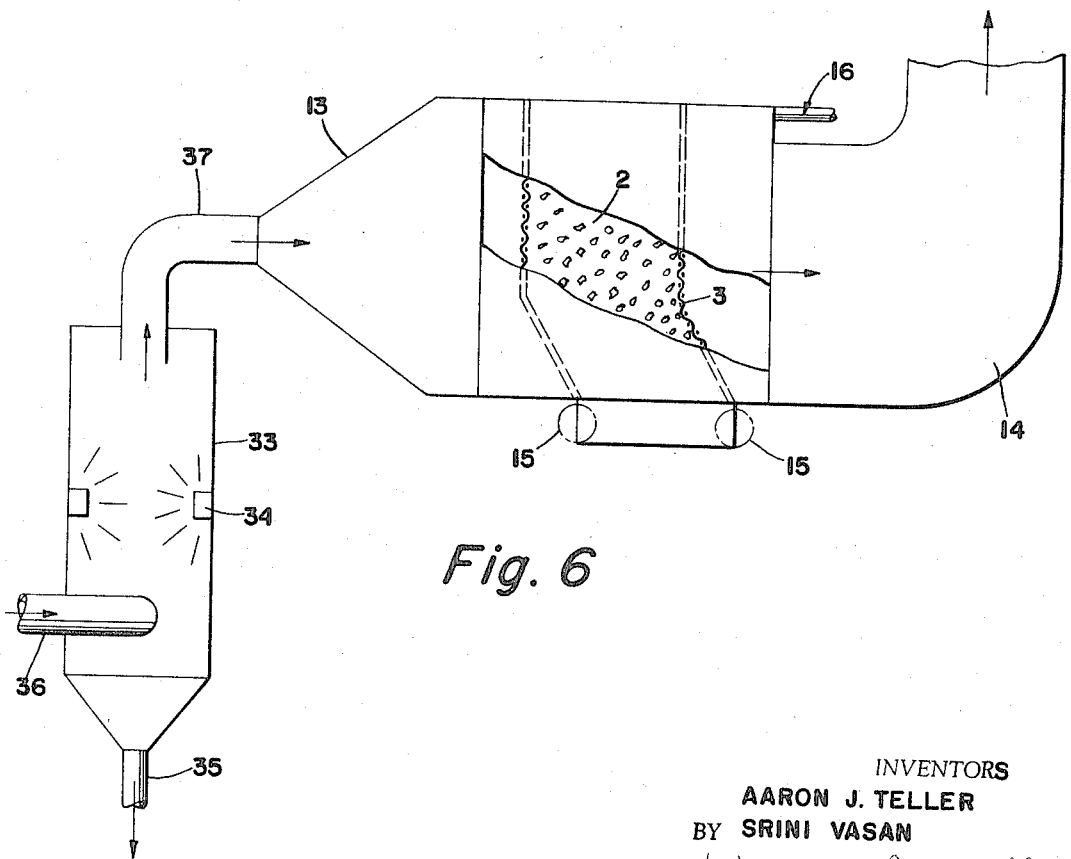

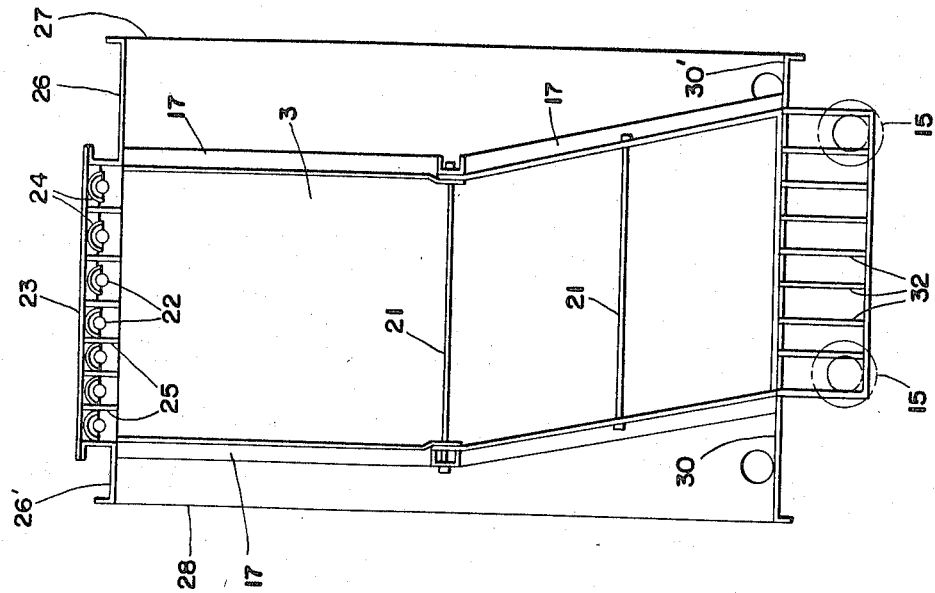
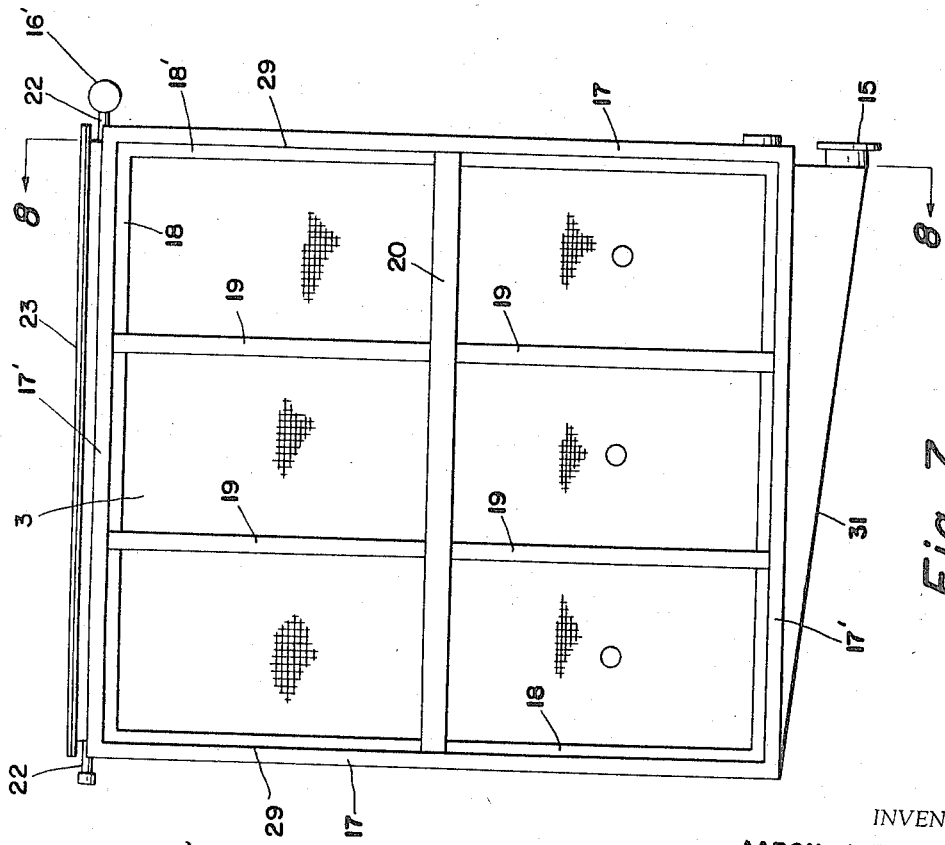

This invention relates to a process for the scrubbing of particulate material from a gas. More specifically, it relates to a crossflow process for scrubbing particles from a gas by the crossflow application of a scrubbing liquid to a gas stream flowing horizontally through a chamber filled with packing units having little continuous extensive surface and separate paths for liquid and gas flows.

Historically, particles have been removed from gas streams either by expenditure of large quantities of energy, such as in electrostatic precipitators, impinging devices, etc., or by enlarging the cross section of ducts in which the gas flows, and reducing the velocity to achieve more effective setting. Both procedures result in high cost of operation or capital investment.

While inertial impaction has long been considered an effective mechanism for effecting the separation of particles from a gas stream, there are a number of difficulties which create problems of efficiency or cost.

The inertial impaction method of particle removal is based on the concept that at a given velocity the suspended particle, by virtue of its higher density compared with the carrier gas has a greater inertia. Therefore, if an obstruction is present the gas will be diverted around the obstruction whereas the particle, as the result of its greater inertia, will impinge or impact upon the obstruction. This generally results in the separation of the particles by adherence to the obstruction or by dropping under the force of gravity.

However, in such a process, the efficiency is highly dependent upon the flow characteristics of the gas stream. When turbulent flow conditions exist, the gas, instead of being diverted around the obstruction in smooth streamlines, will flow in eddy form. Although the gas will flow in gross form around the obstruction, its micro motion will be in the form of eddies. This combination of small circular and violent motions causes the particle to remain suspended in the gas stream and signficantly reduces the efficiency of removal by impact. To avoid or greatly reduce the eddies and the resultant inefficiencies, the obstructions designed for removal of particles by impact are generally made large and in streamline shape, or the velocity of the gas stream is greatly reduced to effect laminar flow conditions. Consequently, in order to obtain any substantial efficiency in the removal of particles from a gas stream by impact, the method is restricted to relatively low rates of gas flow, or an excessively large capital investment is required for large size equipment.

In impact methods using packed towers for removal of particles from the gas stream these have been highly unsuccessful for a number of reasons. For example, the deposition of the particles on the packing causes plugging and inordinately large quantities of flushing liquids are necessary for proper irrigation to remove particles from the packing. Moreover, there is a high pressure drop in forcing the gas through the packing. Consequently, the excessive size of equipment required, the low efficiency of the process, and the resultant high cost make this a highly undesirable method. Even in the separation of liquid particulates that do not cause clogging, a maximum of only 60% efficiency was achieved with a Berl Saddle packed column and that in a very narrow range of operation [Massey, Chem. Eng. 66 (14), 143 (1959)].

In accordance with the process of this invention, it has been found that particles both solid and liquid can be removed from a gas stream efficiently, simply and relatively inexpensively by first passing the gas stream through a cyclone separator, a spray tower or a venturi for removal of a portion of the particles particularly the larger particles, and then passing the gas stream through a packing having little continuous extensive surface and using a scrubbing liquid in crossflow with the gas stream. Whereas it was previously found necessary to have large streamlined obstructions for removing particles by impact, or to have an inordinately slow rate of gas stream flow it has now been found possible by the process and apparatus of this invention to have a relatively high rate of gas flow through the packing described herein and thereby achieve essentially streamline flow conditions for effective removal of the suspended particles.

For example, whereas gas is generally passed through a packed column at a rate of 2–4 feet per second for such purpose, the gas stream in this case is passed through the packing described herein at a rate of approximately two and one-half times as fast, namely, 5–10 ft. per second, Because of the permissible higher gas flow rate, the particle removal apparatus of this invention is less than half the size of that normally considered for this purpose.

The type of packing used in the process of this invention permits a reduction of the equivalent diameter of the chamber and thereby the achievement of laminar flow. For example, the Reynolds number for gas flowing in a duct is 100 sq. ft in cross section t 8 ft. per. second, is 600,000. In contrast, a gas flowing at the same linear rate through a chamber having the same cross section, but filled with the packing described herein, has a Reynolds number of approximately 2000. Thus at the same linear velocity, the condition of gas flow changes from that of extreme turbulence to one of transitional-laminar flow. The latter type of flow permits maximum efficiency of the inertial impact mechanism.

As described in greater detail hereinafter, the packing used in the process of this invention presents a minimum of extended surfaces to the gas flow. This packing is a filamentous packing presenting narrow rectangular elements to the gas flow and thereby optimizes capture of the particles. Preferably, the free volume is about 75–95% of the gross volume, or in other words, the gross volume is 4–20 times the water displacement volume. In addition, because of the high free volume of this type of packing, the pressure drop of the gas is low.

Crossflow application of the flushing liquid is necessary to achieve the objectives desired. In this crossflow, the gas flows horizontally and the liquid vertically downward. One of the advantages of this crossflow is that there is the absence of restricted areas for gas flow generally provided in the support plate for the packing which create problems in flow by the formation of occlusions.

Moreover, since the quantity of liquid required for flushing down the particles is a significant economic consideration, the crossflow of flushing liquid to the direction of gas flow permits a high irrigation rate with a smaller quantity of flushing liquid. The liquid consumption for the same flushing rate may be as little as only one-fourth in the crossflow system as required in the counterflow system. Moreover, since the gas stream is not working against the gravitational force of the liquid flowing through the gas stream as in the counterflow system, the pressure drop for the crossflow unit is less than one-half that obtained in the counterflow system.

The following table compares the liquid requirement for countercurrent and crossflow systems for a specific application.

|  | Countercurrent (Berl Saddles) | Crossflow (Tellerettes) |
| --- | --- | --- |
| Depth of Bed, feet | 5 | 5 |
| Gas Flow, cu. ft./min | 14,800 | 14,800 |
| Gas Flow, lb./hr. ft.$^2$ | [1] 850 | 1,700 |
| Liquid Flow, lb./hr. ft.$^2$ | 5,000 | 5,000 |
| Cross Section to Gas Flow, ft.$^2$ | 78.5 | 39.75 |
| Geometry of Packing Volume | ([2]) | ([3]) |
| Area for Irrigation, ft.$^2$ | 78.5 | 25 |
| Liquid Flow, g.p.m | 785 | 250 |
| Pressure drop, inches of water | 4.0 | 2.0 |

[1] Above this value, unstable operation would result.
[2] 10′ D. × 5′ high.
[3] 8′ high × 5′ wide × 5′ deep.

The types of packing that operate most satisfactorily in the process and apparatus of this invention are disclosed in applicant's Patent 2,867,425, issued Jan. 6, 1959, and are available commercially under the trademark "Tellerettes." These are illustrated in the accompanying drawings and are also described hereinafter.

In the accompanying drawings,

FIG. 1 is a plan view of one form of this packing.

FIG. 2 is an elevation view of this same form of packing.

FIG. 3 is a plan view of another form of packing of this type.

FIG. 4 is an elevation showing the unit of FIG. 3 in a partially fabricated condition.

FIG. 5 is an end view of the unit shown in the condition of FIG. 4.

FIG. 6 is a schematic view of cyclone separator and a crossflow scrubber showing a partial cross section of the crossflow unit filled with packing of the type described herein.

FIG. 7 is an elevational view of the crossflow scrubber portion of the unit shown schematically in FIG. 6 showing the side into which the dust laden gas stream is introduced.

FIG. 8 is a cross sectional elevational view taken at line 9—9 of the unit shown in FIG. 8.

In removing large particles by passage of the gas stream through the cyclone separator, or spray or venturi, the effect of the crossflow scrubber is applied on that size and portion of the dust particles which is generally more difficult to remove and for which the crossflow scrubber is the most efficient unit.

For flushing the particles from the packing, any liquid is suitable provided it does not react with or become absorbed in or swell the packing material. Water is generally used but various types of solutions which are cheaply available or which are waste products from other processes can be used. For example, very often brine or sea water is more vailable in certain locations than fresh water and can be used advantageously. Since the flushing liquid itself becomes dirtied by the removal of the particles from the packing, it is even possible to start with liquids already dirty provided the amount of dirt present will not interfere with the removal of the deposits from the packing.

As previously indicated, the type of packing described herein is the only type that can be used. Other types of packing such as Raschig rings become plugged eventually and even before this state is reached, excessive quantities of flushing liquor are required.

The crossflow system is designed so that there is no free space in the area of the scrubber which is being irrigated with flushing liquid. The flushing liquid can be sprayed or dripped into the packed area by various means and advantageously should have uniform distribution over the area. For example, pipes having perforations therein can be used as the spraying means. In the upper region where the pipes are located, it is desirable to have baffles running in a direction perpendicular to the direction of gas flow and extending down to the top or even below the top of the bed of packing units. This will insure contact of all the gas with the packing.

The packing units can be made of various materials such as glass, metal, ceramics, etc., but are preferably made of polyethylene or other resinous materials such as polychloroethylene, polychlorofluoroethylenes, polytetrafluoroethylene, polypropylene, etc.

The process of this invention can be used for the removal of any type of particle and from any type of gas provided that the respective materials in the gas stream are compatible or nonreactive with the materials of construction and packing used in the scrubbing units so that corrosion and deterioration will be avoided.

In the operation of the process of this invention, gas flow rates of 1000–3500 lbs. per hour per sq. ft. and liquid flow rates of 1000–20,000 lbs. per hour per sq. ft. are advantageous.

The length of the crossflow scrubber will be determined somewhat by the amount of particles to be removed from the gas stream and the degree to which they are to be removed. For example, in order to improve the efficiency in removal of final traces of dust, the length of the crossflow scrubber can be increased to attain such efficiencies. Where the tolerance for dust particles in the exit gas can be higher, a shorter crossflow scrubber is appropriate. Generally, however, satisfactory efficiencies are obtained in scrubbers having a length of 0.5–5 feet in the packed section. For greater efficiency, it may be desirable to use lengths of 7–12 feet in the packed section.

Referring now to the accompanying drawings, FIG. 1 and 2 show two views of a unit of tower packing. This unit consists of a single filament 10 which is first formed into a helix having eight convolutions and then the helix bent around and the ends joined so that the unit may then be considered as having a toroidal shape defined be eight spaced, circular filament portions, each corresponding to one convolution of the helix where the spaced, circular filament portions are continuous with adjacently spaced filament portions in end to end relationship, being integral and continuous. It is immaterial whether the shape of this unit be referred to as a helical torus or as a toroidal helix and the number of convolutions may be greater or less than eight, although for best results there should be at least six convolutions and not more than twelve. Eight is believed to be the optimum. Although the unit described above and set forth in FIGS. 1 and 2, may be made by first forming a single filament such as 10 into the form of a helix and thereafter bending the helix around and joining the ends thereof, it is not essential that the ends be joined so long as substantially the same form of unit, namely a toroidal helix, is produced. If the filament is sufficiently rigid, it will retain its shape even though the ends are not actually joined.

The convolutions of the toroid helix of FIG. 1 and the loops of FIG. 3 are approximately circular but can depart more or less from true circular. It may be, for example, polygonal. Such variations are obviously equivalent to the forms shown and are intended to be included in the term, "approximately circular." If the unit is composed of polyethylene or polyfluoroethylene, or a polychlorofluoroethylene (e.g. polymerized $CClF=F_2$) it will be sufficiently flexible to permit easy forming into the toroidal shape. Additionally, in such a case where the unit is made of these materials, the unit will also have non-wetting characteristics which are quite desirable. By "non-wetting," it is meant that the liquid has less attraction for the surface than required to overcome its own surface tension so that it tends rather to form aggregates than to spread out over the surface in a film. In speaking of a filament "depth" herein with respect to a rosette of the toroidal spaced filament type there is meant the thickness of the filament measured on a radius, as for instance, the distance from point 7 to point 8 on FIG. 2. The "width" of the filament is that corresponding to the distance between points 5 and 6.

In FIGS. 3 and 4, there is shown a similarly shaped unit which may be formed by slicing nearly through a tubular element having the cross section shown in FIG. 5 and having the cuts indicated in FIG. 4 and then bending the unit around to the position shown in FIG. 3 and joining the portions 12 (as by fusing in the case where the material of construction is thermoplastic such as polyethylene) so that there results a unit having seven rings 11 and one ring 12 made up of the two half thicknessess. It will be apparent that the unit described and shown in FIGS. 3, 4 and 5 likewise has a toroidal shape defined by spaced approximately circular filament portions such as 11 and 12.

It will be obvious that other torus shaped units may be made wherein the toroidal shape is defined by spaced filament portions and that accordingly the particular shapes set forth in FIGS. 1 through 5, which may be termed "rosettes" are not to be construed as limiting the scope of the invention to the precise shapes shown. For example, the filaments may be rectangular, square, circular, or any other appropriate shape in cross section so long as the toroidal shape of the unit is maintained wherein the torus is in effect substantially defined by spaced, approximately circular filament portions. Variations, accordingly, may be made in the shapes illustrated, but it is desirable to preserve the filamentous character of the packing, its ability to interlock one unit with another, and its characteristic of having numerous bends which may be curves as shown or angles such as might be the result, for example, if the cross section of the tubular element in FIG. 4 were not circular as shown in FIG. 5 but polygonal. Preferably the unit is manufactured from polyethylene, polychloroethylenes, polychlorofluoroethylenes, or polyfluoroethylenes so that the unit will also have flexibility as well as the nonwetting property.

For best results, the gross volume of each unit should be from 4 to 20 times its displacement volume, and the bulking volume of each unit should be from 50% to 90% of the gross volume. The term "gross volume" as used herein means the volume of the smallest circumscribed solid free from concave surfaces. The term "displacement volume" as used herein with respect to a unit of tower packing means the volume of water displaced by the unit when it is submerged by water. The term "bulking volume" as used herein with respect to a unit of tower packing means the volume occupied per unit when a receptacle of cylindrical shape is filled with such units without compression beyond that due to their own weight to a depth equal to its diameter, the volume so filled being fifty times the gross volume of one unit. It will be apparent that the bulking volume is influenced by the ability of the units to interlock with each other. In the case of a ¾" x 1⅛" rosette, the volume of the circumscribed rectangular prism is about 2.6 cubic inches; the gross volume is about 1.9 cubic inches; and the bulking volume is about 1.4 cubic inches.

With respect to the size of the filaments, the minimum length for one approximately circular filament portion should be at least 8 times the cross sectional dimension thereof, whereas the internal radius of curvature at all points within the torus suitable are less than 4 times the major cross sectional dimension of the filament.

FIG. 6 shows cyclone separator for preliminary removal of dust, particularly of large particles. This comprises a tower 33, sprays 34, liquid and dust outlet 35, gas inlet 36 and gas outlet 37 feeding into inlet 13 of the crossflow scrubber. The crossflow scrubber comprises a tower 1 containing packing material 2 as described herein wherein the packing material 2 is retained by screen 3 which is preferably polyvinylchloride coated expanded metal grilling advantageously of 1½ inch No. 6 type or 1" x 4" subway grating. The dust-laden gas is introduced into the unit through inlet 13 and after passing through the scrubbing unit is exhausted from the unit through gas outlet 14. The scrubbing liquid is fed in at the top of the unit through liquid inlet 16 and passes out at the bottom of the unit through outlets 15.

As shown in FIGS. 7 and 8, vertical flanges 17 and horizontal flanges 17' are the frame work for the unit supporting plates 18, 19 and 20 which hold the expanded metal grill 3 in position, which in turn retains the packing units (not shown) with which the crossflow scrubber is filled. These plates are strengthened and prevented from buckling under the pressure of the packing by tie rods 21.

Manifold liquid inlet 16' feeds scrubbing liquid into a series of pipes 22, connected thereto and running horizontally in a direction perpendicular to the direction of gas flow through the unit. These pipes are perforated through that portion of their lengths extending within the scrubbing unit and are supported just under the cover plate 23. Half pipes 24 are positioned above and halfway around perforated pipes 22 so that spray from the upper region of pipes 22 will be deflected downward into the packed section of the scrubbing unit. Dividers 25 extend the width of the scrubbing unit and extend below the level to which the scrubber is filled with packing units, so as to prevent any gas from flowing in free spaces of the unit and thereby escape contact with the packing units.

Plates 26 and 26' connect with top plate 23 together with front and back walls 27 and 28 and side walls 29 and base plates 30 and 30', to complete the enclosure of the gas space through which the dust-laden atmosphere is passed through the scrubbing unit. The scrubbing liquor after passing through the packed section passes through perforated supporting plate or screen 33 and collects in the bottom of the scrubber and is caused by inclined base plate 31 to flow out liquid outlets 15. Baffles 32 extend the width of the scrubbing unit and prevent gas flow through this open space below the packed area of the tower. The dust flushed from the packing units after being scrubbed from the gas are carried out these outlets 15 by the flow of the scrubbing liquor.

The efficiency of the crossflow scrubbing unit of this invention is most prominent in the removal of dust particles having a size in the range of 0.5–10 microns. Particles above this size are removed quite easily by various systems such as cyclone separators and thereafter do not need the apparatus of this invention. It is to be noted that although the invention described recovers particles less than 0.5 micron in size, the target efficiency for the packing by theory (Langmuia and Blodgett, U.S. Army Air Forces Tech. Dept. 5418, Feb. 19, 1946), is 0% for 1 micron particles, 0% for 5 micron particles, and 72% for 10 micron particles for conditions of operation utilized in the test system.

With regard to particles having a size smaller than 0.5 micron, the efficiency of the apparatus and process of this invention can also be applied to other dust removal processes and apparatus. This improvement comprises effecting the condensation of moisture on the particle and thereby increasing the effective size of the particle, that is the combined size of the particle and the moisture condensed thereon. This permits very tiny particles to be more effectively removed.

This moisture condensation can be effected by increasing the humidity of the dust-laden gas so that it is saturated above the dew point prior to entering the scrubbing unit. Then by cooling action of the water or liquid passing through the scrubbing unit, the moisture in the gas is caused to condense on the particle and thereby increase the effective particle size and improve the efficiency of removal of the particles from the gas. The increase in humidity can be effected by various means such as the introduction of steam by cooling the gas entering the system, or by direct water spray, etc.

While this method is particularly appropriate in the range of particle sizes below 0.5 micron because of the greater difficulty of removing such small size particles, this improvement can also be applied to facilitating the removal of particles even larger than 0.5 by increasing the effective size by the condensation of water thereon.

There is no limit to the operating temperature of the scrubber except as dictated by practical considerations. The packing units should be made of materials which can stand the particular temperature used and the scrubbing liquid will be one appropriate for contact with the gas at the particular operating temperatures. Where hot gases are being processed, steel packing can be used and the scrubbing liquid will be one which will not vaporize to any undesirable extent by contact with the hot gases. Where the hot gases are to be recycled or reused in some way, it is advantageous to remove the dust particles without loss of the latent heat in the gas.

In copending application Ser. No. 461,965, filed the same date herewith by Aaron J. Teller, the process for removal of particles from a dust-laden atmosphere is disclosed and claimed per se. However in the present invention, preliminary dust removal is effected by a cyclone separator, a spray unit or a venturi. In this way the larger dust particles are removed first and the cross-flow unit is used for separating the smaller particles, which are more difficult to remove, and to effect removal of the particles from a gas of lower dust concentration which is also more difficult.

The invention is best illustrated by the following examples. These examples are intended merely for purpose of illustration and it is not intended to limit the scope nor the manner in which the invention can be practiced by these examples. Except where specifically indicated otherwise, parts and percentages are given by weight.

EXAMPLE I

Air containing particles of potash dust is passed first through a cyclone scrubber and then through a crossflow scrubber unit of the type illustrated in FIGS. 6–9 and under the conditions described below. The particle size distribution of the dust in this atmosphere is:

| Size, microns— | Percent by wt. |
|---|---|
| 0–2 | 32 |
| 2–4 | 14 |
| 4–6 | 11 |
| 6–8 | 10 |
| 8–10 | 8 |
| 10–45 | 25 |

This dust has a composition of 55% KCl, 40% NaCl and 5% oil and insolubles. The dust laden air is at 150° F. and saturated with moisture. This flows into the system at a rate of 50,000 cu. ft. per minute.

The following table gives the solids content of the gas at the inlet of the cyclone separator.

*Cyclone separator*

[Solids content, grains/cu. ft.]
INLET 1.270
1.340
1.454
1.972
5.238

The cyclone separator has a 3–10% brine solution sprayed into the gas at a rate of 600 gallons per minute. The pressure drop through this unit is 4.5 inches of water.

The exit gas from the cyclone separator is then fed into the crossflow scrubbing unit. The face area of the scrubbing unit for gas flow (the cross sectional area of the section of the scrubbing unit filled with the packing units) is 90 sq. ft. The liquid flow area or the horizontal cross section of the packed area in which the liquid flows vertically downward is 36 sq. ft. The scrubbing liquid is fed at a temperature of 40–80° F. into the scrubbing unit at a rate of 250 gal. per minute. This liquid is a brine solution having 3–10% by weight of salt dissolved in water. The depth of the packing is 4 ft. The solids content values in grains per cu. ft. of inlet and outlet gas for the crossflow scrubber and the accompanying efficiencies in that unit are given in the table below.

*Crossflow scrubber*

[Solids content, grains/cu. ft.]

| Inlet | Outlet | Percent Efficiency | Overall Efficiency |
|---|---|---|---|
| 0.064 | 0.023 | 64 | 90.3 |
| 0.143 | 0.053 | 64 | 96.0 |
| 0.160 | 0.040 | 75 | 97.2 |
| 0.320 | 0.070 | 78 | 97.7 |

The average outlet loading for high dust loading feed according to the above procedure is 0.07 grain per cu. ft., whereas the average outlet loading for low dust loading is 0.053 grain per cu. ft. Thus the level of particle size reduction is essentially independent of the dust loading in the feed stream, that is, in the range of 0.064 in the outlet for 5.38 grains per cu. ft. in the inlet gas.

The pressure drop in each of these crossflow unit tests ranges from 2.0 to 2.6 inches of water.

EXAMPLE II

The procedure of Example I is repeated with similar results except that air laden with phosphate rock dust is used. The particle size distribution is:

| Size, microns— | Percent by wt. |
|---|---|
| +100 | 5 |
| 44–100 | 2 |
| 20–44 | 21 |
| 10–20 | 57 |
| 5–10 | 10 |
| 0–5 | 5 |

EXAMPLE III

The procedure of Examples I and II are repeated with similar results using in place of the cyclone separator a spray unit in one case and a venturi in another case.

The invention claimed is:
1. A process for the liquid contact treatment of a gas having finely divided particles suspended therein comprising the steps of:
 (a) passing said gas through a dust separation device whereby a preliminary removal of a portion of said dust is effected thereby;
 (b) then passing said gas in a horizontal path through an enclosure completely filled with a filamentous packing having little continuous extensive surface, and having about 80–85% free volume therein; said packing consisting of randomly arranged, interlocked tower packing units, the units being made up of approximately circular, integrally connected filament portions having their axes approximately tangent to a circle at approximately evenly spaced points therearound, the number of such spaced approximately circular portions being from 6 to 12 and the diameter of such circle being approximately equal to the diameter of one of such approximately circular filament portions plus the diameter of a smaller circle whose circumference is not less than the cross-sectional di- mension of the filament portion in the direction of its axis times the number of such filament portions and not greater than the circumference of one of such approximately circular filament portions;

(c) while said gas is being passed through said enclosure, distributing a liquid in particulate form and in a direction perpendicular to gas flow at the top of and through a substantial portion of said packing, and (d) collecting the liquid after passage through said packing.

2. A process as recited in claim 1 wherein said dust separation device is a cyclone separator.

3. A process as recited in claim 1 wherein said dust separation device is a spray scrubber.

References Cited
UNITED STATES PATENTS

| | | | |
|---|---|---|---|
| 2,057,579 | 10/1936 | Kurth | 55—228 X |
| 2,332,224 | 10/1943 | Heath et al. | 261—94 |
| 2,523,441 | 9/1950 | McKamy | 55—233 X |
| 2,676,670 | 4/1954 | Gagnaire | 261—21 X |
| 2,867,425 | 1/1959 | Teller | 261—95 |
| 3,006,436 | 10/1961 | Starbuck et al. | 261—95 X |
| 3,151,187 | 9/1964 | Comte | 261—98 X |
| 3,210,914 | 10/1965 | Eckert. | |

HARRY B. THORNTON, *Primary Examiner.*

T. R. MILES, *Assistant Examiner.*